US011513328B2

(12) United States Patent
Pannhoff et al.

(10) Patent No.: US 11,513,328 B2
(45) Date of Patent: Nov. 29, 2022

(54) METHOD AND MICROSCOPY SYSTEM FOR RECORDING AN IMAGE

(71) Applicant: EUROIMMUN Medizinische Labordiagnostika AG, Luebeck (DE)

(72) Inventors: Helge Pannhoff, Hamburg (DE); Martin Hagen-Eggert, Luebeck Schleswig-Holstein (DE); Markus Morrin, Luebeck Schleswig-Holstein (DE); Matthias Müller, Luebeck Schleswig-Holstein (DE); Tilman Johannes Sumpf, Luebeck Schleswig-Holstein (DE)

(73) Assignee: EUROIMMUN Medizinische Labordiagnostika AG, Luebeck (DE)

( * ) Notice: Subject to any disclaimer, the term of this patent is extended or adjusted under 35 U.S.C. 154(b) by 342 days.

(21) Appl. No.: 16/623,440

(22) PCT Filed: Jun. 20, 2018

(86) PCT No.: PCT/EP2018/066494
§ 371 (c)(1),
(2) Date: Dec. 17, 2019

(87) PCT Pub. No.: WO2018/234419
PCT Pub. Date: Dec. 27, 2018

(65) Prior Publication Data
US 2020/0209599 A1 Jul. 2, 2020

(30) Foreign Application Priority Data

Jun. 20, 2017 (EP) ..................................... 17001037

(51) Int. Cl.
*G02B 21/06* (2006.01)
*G02B 21/00* (2006.01)
(Continued)

(52) U.S. Cl.
CPC ......... *G02B 21/006* (2013.01); *G02B 21/008* (2013.01); *G02B 21/0032* (2013.01);
(Continued)

(58) Field of Classification Search
CPC ................ G02B 21/00; G02B 21/0012; G02B 21/0016; G02B 21/0032; G02B 21/0052;
(Continued)

(56) References Cited

U.S. PATENT DOCUMENTS 6,344,930 B1   2/2002   Kaneko et al.
7,433,129 B2  10/2008   Riedmann
(Continued)

FOREIGN PATENT DOCUMENTS

DE   10 2008 015 885   10/2009
DE   10 2014 002 584    7/2015
(Continued)

OTHER PUBLICATIONS

Examination Report dated Oct. 29, 2020 in Australian Application No. 2018287064.
(Continued)

*Primary Examiner* — Thong Q Nguyen
(74) *Attorney, Agent, or Firm* — Grüneberg and Myers PLLC

(57) ABSTRACT

A method and microscopy system are useful for recording an image of a sample region. A laser beam is directed onto the sample region with interface(s). An objective lens facilitates images the laser beam on a focusing point which lies on the optical axis of the objective lens or an axis parallel thereto, and which lies in a focusing plane. The objective lens and the sample region are displaced with respect to one another in relative fashion along the optical axis of the objective lens to different relative displacement positions. Intensity values of the laser beam are captured for a respective relative (Continued)

displacement position. A respective highest intensity value for a respective displacement position, a curve of the highest intensity values, and a reference relative displacement position from at least one maximum of the curve, are determined. Image(s) of the sample region is/are captured at the reference relative displacement position.

15 Claims, 8 Drawing Sheets

(51) Int. Cl.
　　*G02B 21/02*　　(2006.01)
　　*G02B 21/24*　　(2006.01)
　　*G02B 21/36*　　(2006.01)
(52) U.S. Cl.
　　CPC ........... *G02B 21/02* (2013.01); *G02B 21/245* (2013.01); *G02B 21/361* (2013.01); *G02B 21/367* (2013.01)
(58) Field of Classification Search
　　CPC .............. G02B 21/006; G02B 21/0064; G02B 21/0076; G02B 21/008; G02B 21/02; G02B 21/06; G02B 21/241; G02B 21/244; G02B 21/245; G02B 21/26; G02B 21/36; G02B 21/361; G02B 21/367
　　USPC .................................................. 359/368–390
　　See application file for complete search history.

(56) References Cited

U.S. PATENT DOCUMENTS

| | | |
|---|---|---|
| 9,250,434 B2 | 2/2016 | Morrin |
| 11,199,500 B2* | 12/2021 | Hagen-Eggert ........ G02B 21/36 |
| 2006/0119866 A1 | 6/2006 | Riedmann |
| 2007/0031056 A1* | 2/2007 | Perz ..................... G02B 21/244 382/128 |
| 2007/0152130 A1* | 7/2007 | Fomitchov ........... G02B 21/006 250/201.3 |
| 2008/0283723 A1 | 11/2008 | Fujimori et al. |
| 2010/0059696 A1* | 3/2010 | Heintzmann ...... G02B 21/0056 359/370 |
| 2011/0309231 A1 | 12/2011 | Cooper et al. |
| 2013/0162804 A1 | 6/2013 | Morrin |
| 2015/0001373 A1* | 1/2015 | Udo ........................ G02B 7/38 250/201.4 |
| 2016/0041380 A1 | 2/2016 | Kuhn et al. |
| 2017/0090176 A1 | 3/2017 | Pospiech et al. |
| 2017/0199367 A1 | 7/2017 | Müller |

FOREIGN PATENT DOCUMENTS

| | | |
|---|---|---|
| GB | 2355354 | 4/2001 |
| WO | 2009/118005 | 10/2009 |
| WO | 2015/110250 | 7/2015 |
| WO | 2015/197601 | 12/2015 |
| WO | 2016/022359 | 2/2016 |
| WO | 2016/133787 | 8/2016 |

OTHER PUBLICATIONS

Extended Search Report dated Dec. 18, 2017 in European Application No. 17001037.5, with English translation, 16 pages.
International Search Report dated Jul. 26, 2018 in International Application No. PCT/EP2018/066494, with English translation, 7 pages.
Written Opinion dated Jul. 26, 2017 in International Applicatoin No. PCT/EP2018/066494, with English translation, 17 pages.

* cited by examiner

FIG. 3
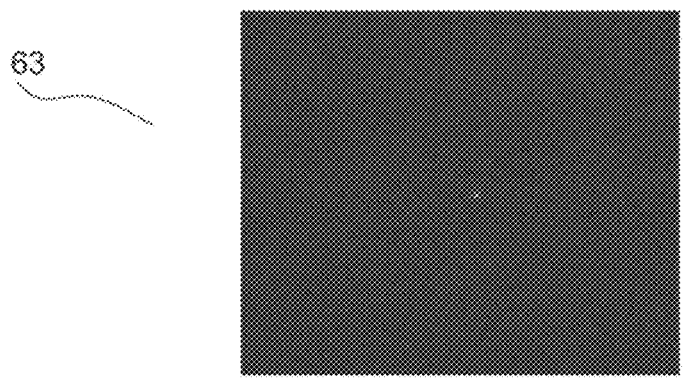
FIG. 4a     FIG. 4b     FIG. 4c     FIG. 4d
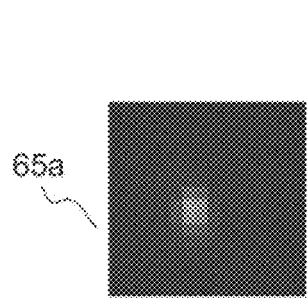 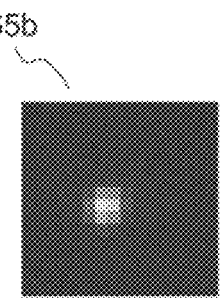 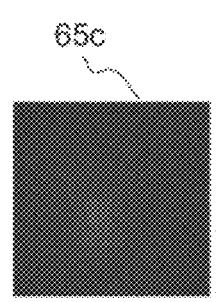 
Z = -0.5 μm   Z = 0 μm    Z = +0.5 μm
$G_{max}$=153   $G_{max}$=223   $G_{max}$=58

METHOD AND MICROSCOPY SYSTEM FOR RECORDING AN IMAGE

CROSS-REFERENCE TO RELATED APPLICATIONS

This application is a National Stage entry under § 371 of International Application No. PCT/EP2018/066494, filed on Jun. 20, 2018, and which claims the benefit of European Application No. 17001037.5, filed on Jun. 20, 2017. The content of these applications is hereby incorporated by reference in their entirety.

BACKGROUND OF THE INVENTION

Field of the Invention

The present invention relates to a method for recording an image of a sample region, in particular for recording a fluorescence image, and further relates to a microscopy system for recording an image of a sample region.

Discussion of the Background

DE 10 2008 015 885 A1 describes a method for carrying out automatic focusing of optical appliances, wherein a measurement light source and an objective are provided for imaging a substantially parallel bundle of rays emanating from the measurement light source onto an observation object for purposes of generating a reflection image, wherein, furthermore, provision is made of an evaluation and adjustment unit that is suitable for ascertaining the focus position from the reflection image and for positioning the objective. In the process, an image with concentric rings is recorded, the diameter of said rings changing on the basis of the distance from the correct focus position.

WO 2016/133787 A1 discloses methods and systems for automatically focusing a microscope on a sample and for recording a focused image of the sample. The recorded measurements are analyzed to determine which measurement contains a peak, a peak value being understood to mean a measurement of a reflected laser beam, which means a maximum intensity as a function of the position of the substrate along the optical axis of the microscope in relation to the position of the objective lens.

DE 10 2014 002 548 discloses a method and an optics apparatus for imaging an object situated within a three-dimensional sample region, wherein a depth profile of the sample region is ascertained by means of optical coherence interferometry, a peak in the depth profile is recognized, said peak originating from a reflection at an object point, an optical path length position of the peak is determined and wherein a geometric path length position of the object point is calculated on the basis thereof. Finally, on the basis of the geometric path length position, the microscope is focused for the purposes of imaging the object.

Conventionally, microscope images were recorded at different depth positions (Z-positions), wherein the optimal focus position was determined by way of evaluating the structure sharpness of the image recordings. However, this method is relatively time-consuming, and so working through a multiplicity of samples with a high throughput is made more difficult.

In solutions from the prior art, such as US20170090176 A1, patterns with an extensive area are sometimes projected onto a plane such as a reflecting boundary surface, wherein, then, the reflected pattern is evaluated pixel-by-pixel by means of an image capturing unit in a virtual mask region and a measure for the focusing between objective and boundary surface or sample region is derived by means of combining the intensity values of a plurality of pixels within the virtual mask.

Consequently, the methods and systems of the prior art cannot ensure fast and reliable focusing of samples in microscopy, more particularly fluorescence microscopy, under all conditions.

Therefore, there is a need for a method and a microscopy system for recording an image of a sample region, wherein fast and reliable focusing can be ensured, in particular of an object embedded in a three-dimensional sample region.

SUMMARY OF THE INVENTION

The need is satisfied by the subject matter of the embodiments below, which are directed to a method and a microscopy system, respectively, for recording an image of a sample region. Other particular embodiments of the present invention are also described below.

According to one embodiment of the present invention, a method for recording an image of a sample region is provided, including: directing a laser beam on the sample region by means of at least one objective, said sample region containing at least one boundary surface, wherein the objective effectuates imaging of the laser beam on a focusing point that is located in a focusing plane, wherein the focusing plane is located in parallel with the focal plane and, in particular, coincides with the focal plane, wherein the focusing point is preferably located on the optical axis of the objective or an axis parallel thereto, wherein the focusing plane further is preferably perpendicular to the optical axis of the objective; displacing the objective and the sample region in relative fashion with respect to one another along the optical axis of the objective to a plurality of different relative displacement positions; capturing, for a respective relative displacement position, a plurality of intensity values of the laser beam that was reflected at the boundary surface and that passes through the objective, said intensity values being detected by pixels of a two-dimensional subarea of a detection area of a microscope camera; determining, for a respective relative displacement position, a respective highest intensity value of the respective plurality of captured intensity values of a subarea; determining a profile of the highest intensity values by assigning the respective highest intensity value to the respective relative displacement position; determining a reference relative displacement position from at least one local maximum of the profile of the highest intensity values and preferably driving to the reference relative displacement position; capturing at least one image of the sample region at the reference relative displacement position, preferably by reading the detector area of the microscope camera or a detector area of a further microscope camera.

In order to provide the reader with an understanding of one or more advantages of the method according to the invention and the apparatus according to the invention, there now are more detailed explanations in this respect.

BRIEF DESCRIPTION OF DRAWINGS

Embodiments of the present invention are now explained with reference to the attached drawings. The invention is not restricted to the described or illustrated embodiments.

FIG. 3 illustrates an example of an image recorded by a microscope camera.

FIGS. 4a, 4b and 4c illustrate examples of a subarea of a detection area of a microscope camera with partial images recorded at different relative displacement positions and FIG. 4d shows an example of a predetermined area within the subarea.

DETAILED DESCRIPTION OF THE INVENTION

Figure 1:
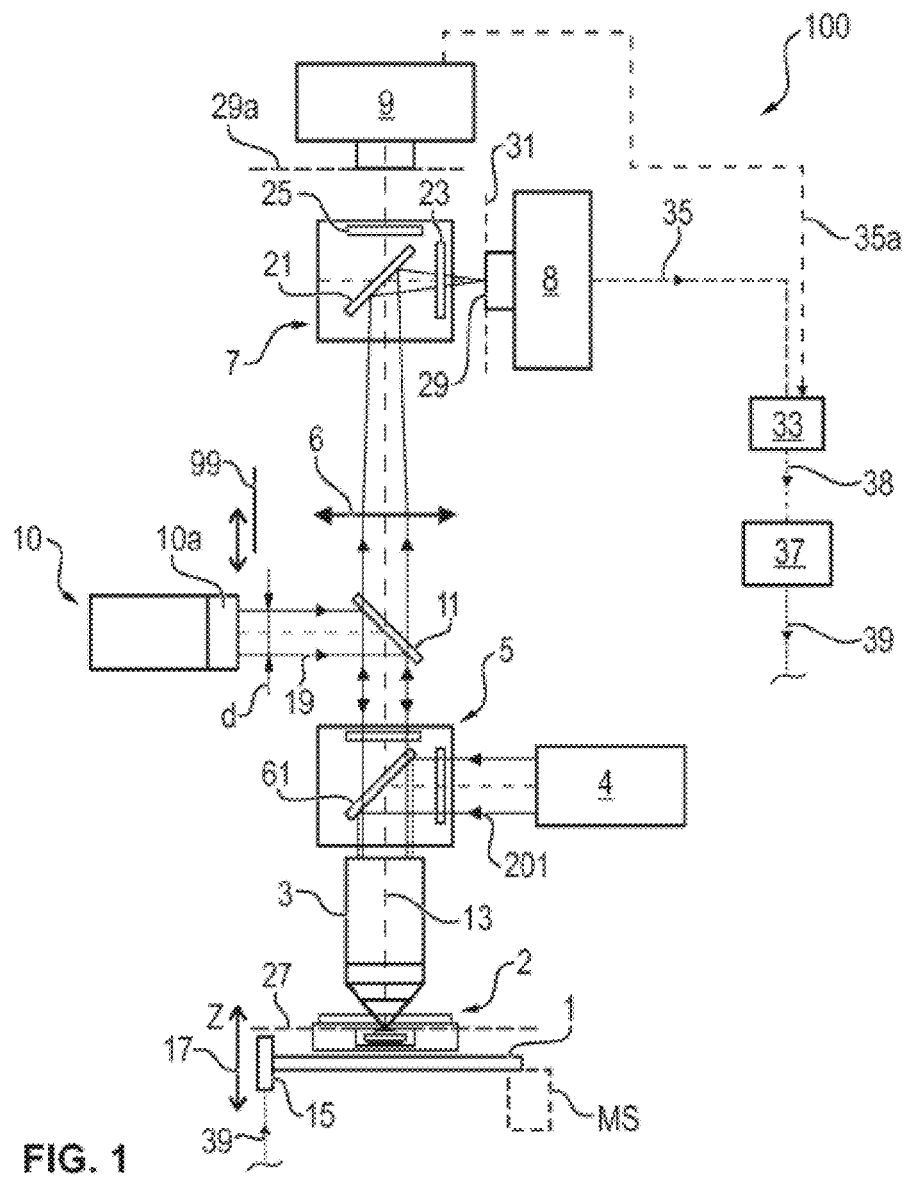
FIG. 1 shows, in a schematic side view, a microscopy system according to an embodiment of the present invention.

The objective is embodied such that it projects laser beams, which enter its optical aperture facing the laser light source parallel to one another as a parallel beam path or as a collimated, parallel bundle of rays, onto a point of a focal plane of the objective on the other side of the objective, wherein the point can be the focus or a point offset from the focus in the focal plane if the bundle of rays is not exactly symmetrically centered on the optical axis of the objective. Laser beams which enter back into the objective from precisely this point, in particular the focus, in the focal plane are, once again, formed into a parallel beam path on the aperture side or the optical side facing the laser source or the microscope camera.

Thus, for example, if the laser beam is a collimated, parallel bundle of rays, the objective generates a projection of the laser beam, with the entire intensity thereof, on the one point, more particularly the focal point, in the focal plane of the objective. The beam path which is captured by the objective from this point, in particular this focus, and is collimated on the other side of the objective to form a parallel, collimated beam path can then be projected onto an imaging point by means of a lens, preferably a tube lens, disposed downstream of the objective, the detection area or the microscope camera being disposed at said imaging point.

In the case where the laser beam is a parallel, combined beam path, the laser beam is then thus projected through the objective onto a point in the focal plane, wherein the point can be the focus or a point offset from the focus in the focal plane. As a result of this, a maximum optical intensity of the laser beam is present at this point in the focal plane. Then, in this case or this example, the focusing plane and the focal plane coincide. If the boundary surface of the sample region is situated exactly at the focal plane as a result of altering the relative displacement position, there is a reflection of the laser beam projected on the point in the focal plane back to the objective, wherein the objective and the tube lens then effectuate an imaging of this reflection on the detector area or microscope camera. The thus, at least one pixel or small number of pixels will then be situated in the subarea of the detector area, said pixels having a particularly high intensity. As a result, the highest intensity value within the subarea can then be focused on particularly advantageously easily in the subarea in order to obtain a measure for the focusing of the sample region. Thus, on account of the use of the laser beam described here, there is no need for further processing or filtering the possibly many intensity values of the subarea; instead, all that needs to be determined is what the corresponding highest intensity value is within the subarea, in the corresponding relative displacement position. Here, it is irrelevant which pixel has detected the maximum value of the intensity values, and so the method is particularly fast. If the sample region is further displaced in relation to the objective into another relative displacement position, a reflection of the laser beam is not implemented at a single point, which was previously the point in the focal plane and, more particularly, the focus; instead, the reflection is implemented in an extensive region of the sample region or the boundary surface. As a result of this, the optical intensity of the laser beam is then thus distributed over a larger region of the subarea than in the case where the laser beam is only reflected at a single point in the focal plane. Therefore, intensity values which, in sum, still represent or are able to represent the entire optical intensity of the laser beam then also arise within the subarea on the detector area or the microscope camera, wherein the highest intensity value now precisely is however also lower than the highest intensity value in the configuration where the laser beam is reflected at precisely the one point in the focal plane by means of the boundary surface. Thus, there is no need to focus on precise filtering of a reflected pattern, for example by means of a stop, by the evaluation of the subarea or the pixels thereof; instead, the evaluation of the highest intensity value for a respective relative displacement position allows particularly simple and fast focusing or determination of the reference relative displacement position with a particularly high spatial resolution. In the case where a plurality of boundary surfaces are present, a third boundary surface can then be detected, for example, by a means of the profile of the highest intensity values in order to ascertain a reference relative displacement position. Consequently, it is thus possible to increase the sensitivity of the method and an extent of the imaged laser beam in the depth direction can substantially equal a depth of field of the optical unit.

In the case where the laser beam converges from the laser light source to the aperture of the objective, a focusing of the laser beam arises on a focusing point in a focusing plane that does not coincide with the focal plane of the objective but lies parallel with the latter; here, the focusing plane extends perpendicular to the optical axis of the objective. If a reflection of the laser beam then is detected at an boundary surface in the manner described above by way of considering the highest intensity value of the subarea, then the boundary surface is situated in the focusing plane but not in the focal plane of the objective and, in particular, slightly closer to the objective than the focusing plane. If this offset between the focusing plane and the focal plane is known as the convergence angle of the laser beam prior to entry into the objective is known, this offset can then be used as a stored or predetermined value in order to bring about final focusing of the sample region to the focal plane. This may be advantageous, in particular, if a reference relative displacement position is estimated initially using a first, coarser distance resolution on the basis of a plurality of maxima of the profile of the highest intensity values and if, following a direction reversal of the relative displacement, the objective and the sample region are once again positioned relative to one another or displaced in a second, finer distance resolution. If the decisive maximum of the profile is detected again during this second displacement with the higher distance resolution, a presence of the maximum can be detected with a more accurate precision only during the second displacement, with at least two successive highest intensity values indicating a negative first derivative in the current displacement direction. Then, the above-described and known optical offset between the focusing plane and focal plane can be used to effectuate a final alignment of the sample region in relation to the objective for actual focusing of the sample region in the focal plane without a need for a direction reversal during the relative displacement. In the case of a direction reversal during the relative displacement, alignment tolerances of mechanical guide elements of the objective and/or of the sample region may have such an effect that the actual desired relative position between objective and sample region is falsified. Such alignment tolerances are sometimes also referred to as reversal play of the mechanism. By means of the variant, described here, in which the focusing plane and the focal plane do not coincide, it is possible to dispense with the aforementioned direction reversal in order thus to avoid a negative effect of alignment tolerances.

According to one embodiment, the laser beam has a collimated parallel bundle of rays, wherein the focusing plane of the laser beam coincides with the focal plane of the objective. In particular, the focusing point preferably coincides with the focus of the objective. In particular, a cross-sectional diameter of the laser beam is substantially equal to the aperture of the objective.

Within the meaning of this application, the phrase focal plane can also be referred to as the phrase focal length plane.

According to one embodiment, the proposed method further includes the steps of: displacing the objective and the sample region in relative fashion with respect to one another by means of reducing a relative distance between the objective and the sample region from a largest distance to a smallest distance using a first distance resolution such that the profile has a plurality of maxima; determining the reference relative displacement position on the basis of the plurality of maxima as a first reference relative displacement position; increasing the relative distance to the first reference relative displacement position with a second distance resolution, which is higher than the first distance resolution, while simultaneously capturing further highest intensity values at the respective, further relative displacement positions; detecting a presence of a local maximum on the basis of the further highest intensity values.

According to one embodiment, the laser beam has a parallel bundle of rays collimated to the objective, wherein, further, the focusing plane of the laser beam coincides with the focal plane of the objective. Here, there then is setting the relative displacement position at which the local maximum detected on the basis of the further highest intensity values is present or was present as a final reference relative displacement position.

According to one embodiment, the laser beam has a bundle of rays that converges to the objective, wherein, further, the focusing plane of the laser beam does not coincide with the focal plane of the objective. Here, there then is renewed increasing of the relative distance by a predetermined default value to a final reference relative displacement position. The focusing plane thus does not coincide with the focal plane of the objective in this embodiment but is located parallel thereto, wherein the focusing plane extends perpendicular to the optical axis.

The source of the laser beam can be deactivated before the pixels of the detection area of the one microscope camera or the further microscope camera are read and a fluorescence light source for exciting a fluorescence radiation of the sample can be activated.

The laser beam may comprise electromagnetic radiation in the visible and/or invisible wavelength range (e.g., infrared, ultraviolet).

The method can be carried out using a microscopy system according to an embodiment of the present invention.

The sample region can be a sample region with an extent in three dimensions, which is consequently extended in two lateral directions and extended in a depth direction perpendicular thereto. In particular, a (biological) sample may be situated within the sample region at a certain depth, a focused image, more particularly a fluorescence image, intended to be recorded of said sample. The method (and the microscopy system) can consequently be used, in particular, in autoimmune diagnostics for evaluating immunofluorescence preparations. In particular, the method and the microscopy system can assist an indirect immunofluorescence test (IIFT). The method can ensure quick working through the samples to be diagnosed, which requires fast focusing of the samples.

The objective may comprise one or more lenses, which can be disposed in succession along the optical axis of the objective. By way of example, the objective may provide a 10-fold, 20-fold or, e.g., 40-fold magnification and may, for example, have a numerical aperture of between 0.3 and 0.8. The light emanating from the sample region and ultimately used for recording the image can comprise visible light, for example green light, red light and/or blue light and may, in particular, have been emitted by a fluorescence emission following a fluorescence excitation from the sample region.

The (depth) range in which the sample is imaged sharply in the object plane of the microscope, the so-called depth of field, depends on the numerical aperture NA of the objective in this case. Here, the following relationship exists between the depth of field $t_w$, the centroid wavelength $\lambda_0$ of the light spectrum to be imaged and the numerical aperture NA:

$$t_w = \lambda_0 / NA^2$$

By way of example, the depth of field can lie between 500 nm and 6000 nm, in particular between 700 nm and 1100 nm. Embodiments of the present invention can determine the reference relative displacement position with an accuracy that substantially equals the depth of field of the objective. Using this, reliable focusing can be ensured.

For the purposes of a relative displacement between the objective and sample region, the objective and/or the sample region can be displaced. Here, the distance between objective and sample region is varied; there is a relative movement between objective and sample region. This displacement can be implemented by way of an actuation of a drive means by a processor, wherein the drive means changes the position of, or displaces, the objective and/or the sample region.

For the purposes of a relative displacement (or movement along the z-direction, i.e., the depth direction) between the objective and the sample region, the sample region can be moved, e.g., relative to a stationary objective or the objective can be moved relative to a stationary sample region (in the Z-direction, i.e., depth direction).

By way of example, an employed laser can have an emission spectrum in the visible red wavelength range. In particular, this laser beam may include wavelengths that overlap with wavelengths provided to record the image of the sample region. By way of example, the wavelength of the laser beam may overlap with an emission spectrum detected in the fluorescence microscopy. Consequently, only a (single) microscope camera is preferably required to assist focusing on the one hand and the intended recording of the image on the other hand. By way of example, the laser beam can be coupled into the beam path of the objective with the aid of a beam splitter. A cross-sectional extent of the laser beam may preferably substantially equal a diameter of the entrance region (or the aperture or the pupil aperture) of the objective.

By way of example, the at least one boundary surface can be a plane boundary surface, for example between a solid material and air, between a solid material and a liquid or between a solid material and an (organic) sample. The presence of the at least one boundary surface can simplify focusing or increase a reliability of the focusing.

The microscope camera or a further microscope camera can be provided in conventional fashion for recording the image, wherein the image may be formed by the totality of the intensity values of the pixels of the detection area of the microscope camera. However, for focusing purposes—and, in particular, for determining the reference relative displacement position—only pixels of a two-dimensional subarea of the entire detection area of the microscope camera are required or read, without it being necessary to read the remaining pixels of the detection area outside of the subarea in a time-consuming manner. As a result, the method can be accelerated. The two-dimensional subarea may, for example, have a size which is 16×16 pixels in the case of a preferred detector area of 2440×2048 pixels, which, in particular, corresponds to approximately 0.005% of the detector area.

Laser beams emanating in different directions from a point, more particularly the focus, of the object-side focal plane of the objective are refracted to form parallel beams by the objective such that, from the view of the focal plane, a parallel bundle of rays is present behind (or downstream in the light path from) the objective. A lens (e.g., a tube lens) disposed downstream of the objective collects the parallel beams at a point in an image-side focal plane of this further lens. Here, the detection area of the microscope camera is located in the image-side focal plane of this further lens. By way of example, the detection area can be an array or a field (more particularly, two-dimensional field) of light-sensitive cells, for example CCD or CMOS light-sensitive cells.

In particular, the size of the predetermined area of the subarea can preferably be chosen so as to ensure that substantially only light emitted in various directions from or at a certain point in the object-side focal plane of the objective is detected by the pixels of the predetermined area. This can exclude light not emanating from the object plane of the objective from being detected. By way of example, the size of the predetermined area may be several square micrometers.

While the distance between the objective and the sample region is varied in the depth direction along the discrete relative displacement positions, the intensity values of the pixels of the two dimension subarea are read at the same time; then, the highest intensity value of the intensity values of the pixels is determined for each relative displacement position (i.e., for each distance between objective and sample region). Thus, the value of exactly one pixel of the subarea is determined as the highest intensity value for a respective relative displacement position.

Each highest intensity value determined thus is assigned to the associated relative displacement position (i.e., distance between objective and sample region). Consequently, a multiplicity of highest intensity values is determined for the multiplicity of different relative displacement positions. Here, the resultant profile for various relative displacement positions may have a plurality of local maxima or a global maximum. The local maxima and also the global maximum can each indicate a reflection of the laser beam at one of the boundary surfaces. Here, the reference relative displacement position may correspond, for example, to a distance between the objective and the sample region at which the laser beam is focused on a specific boundary surface within the sample region, in particular a boundary surface between a substrate carrier that is also referred to as biochip below (in particular the surface of the biochip) and an encapsulation medium (or embedding medium). Ascertaining the reference relative displacement position can then ease setting a relative displacement position for recording the image. By way of example, the image can be recorded when setting the reference relative displacement position; preferably, further images can then be recorded at positions around the reference relative displacement position, for example at other relative displacement positions that have a slightly larger (a few micrometers) distance (and/or smaller distance) between the objective and sample region. Further knowledge about the nature and geometry of a sample situated within the sample region may ease a suitable setting of a relative displacement position for recording the image proceeding from the reference relative displacement position.

Preferably, for the purposes of determining the reference relative displacement position, a multiplicity of partial images can be recorded during the relative displacement of the objective and the sample region and can be evaluated continuously in respect of the respective highest intensity value. It is possible, for example, to record several thousand partial images per second. The exposure times may lie in the microsecond range. An increment in the depth direction between two partial images can lie between 200 nm and 1000 nm, more particularly at approximately 500 nm. The increment between two partial images should be no greater than the depth of field of the microscope.

This can ensure reliable focusing for the purposes of recording the image and a high throughput can be ensured on account of the fast determination of the focus.

According to one embodiment, the method further includes the steps of: displacing the objective and the sample region in relative fashion with respect to one another along the optical axis to respective concluding relative displacement positions above and/or below the reference relative displacement position or the final reference relative displacement position; capturing respective images at the respective concluding relative displacement positions by means of the first or the further microscope camera and storing the respective images; determining respective focus metrics for the respective images; selecting the image with the best focus metric. The other images, which do not have the best focus metric, are preferably discarded. This allows an image to be obtained in automated fashion, said image being optimal in respect of its focusing without said image needing to be observed by a user and needing to be adjusted by the latter since this image is stored directly; then, the microscope need not be put into an operational state at the end of the method, in which operational state objective and sample region are optimally aligned with respect to one another; instead, the image can be called from a memory at a later time. The focus metric referred to here can preferably be based on one or more of the following operators: Marr-Hildreth operator, Laplacian of Gaussian and difference of Gaussian.

According to one embodiment, a diameter of the laser beam is dimensioned in such a way that the full aperture of the objective is illuminated.

According to one embodiment, the subarea is less than 1/10 of the detector area, more particularly less than 1/100 of the detector area. Preferably, the subarea has less than 50×50 pixels, more particularly less than 20×20 pixels.

According to one embodiment of the present invention, the method is configured in such a way that the subarea has a size of between 350 µm^2 and 6400 µm^2, more particularly between 750 µm^2 and 1300 µm^2, and, in particular, said subarea is formed by 16×16 pixels, wherein the detection area, in particular, has a size that is between 10 and 100 times larger than the size of the subarea. A choice of a smaller subarea allows the method to be carried out quicker.

According to one embodiment, a lens, more particularly a tube lens, which images a focal plane of the objective on the detection area, is disposed in a detection beam path between the objective and the detection area. A parallel beam path can be present behind the objective (downstream in the light path thereof) and the parallel beams can be imaged by the tube lens into an image-side focal plane. Consequently, a displacement of the objective relative to the tube lens has no influence on the imaging of the parallel beams into the image-side focal plane of the tube lens. Consequently, only beams that emanated in various directions from a certain, common point in the focal plane of the objective, more particularly the focus, reach a certain point within the subarea of the detection area. By way of a suitable choice of the size of the predetermined area, it is thus possible to preclude stray light (which has not emanated in various directions from a point in the object-side focal plane of the objective) from the detection for focusing purposes.

According to one embodiment of the present invention, the method is embodied in such a way that at least one boundary surface does not adjoin air, more particularly that two boundary surfaces do not adjoin air, wherein the sample region comprises, in particular, an organic sample that rests on a biochip, that is embedded in a liquid substance and that is covered by a coverslip, wherein, further, the upper side, in particular, of the coverslip forms a first boundary surface, wherein the lower side of the coverslip forms a second boundary surface, and wherein the surface of the biochip forms a third boundary surface. By way of example, the organic sample may comprise a histological sample, which, e.g., is stained and/or to which one or more fluorescence marker(s) or fluorescence molecule(s) were added. The fluorescence markers or the fluorescence molecules can be attached to the organic sample at predetermined sites or receptors or antigens. By way of example, the liquid substance may comprise glycerol. By way of example, the organic sample can be a wet organic sample, with the sample desiccating possibly being prevented. Embodiments of the invention allow an organic sample embedded in a liquid (in three-dimensional fashion, i.e., substantially from all sides) to be imaged. The boundary surfaces may be characterized by a change in the refractive index above and below the boundary surface. By way of example, the refractive index may have a less pronounced change at the boundary surface between a liquid medium and a solid medium than in the case of a boundary surface between air and a solid medium, for example glass. The reflectance at the boundary surface may be lower, the smaller the change of the refractive index is at the boundary surface. Despite a relatively low reflection at the third boundary surface, the latter can be detected by the method according to the invention.

According to one embodiment of the present invention, the method is embodied in such a way that a relative distance between the objective and the sample region is initially reduced proceeding from a greatest distance while intensity values of the pixels of the subarea are captured, and so, in particular, a first local maximum originating from the reflection of the laser beam at the first boundary surface is detected first, followed by a second local maximum originating from the reflection of the laser beam at the second boundary surface and, finally, a third local maximum originating from the reflection of the laser beam at the third boundary surface. The first local maximum can be a global maximum of the profile of the maxima as a function of the relative displacement position. If all three (local) maxima are detected in the profile of the maxima as a function of the relative displacement position, the reliability of the focusing can be improved. By way of example, a (local) maximum can be determined within the profile of the maxima as a function of the relative displacement position when a certain threshold of the intensity of the pixel is exceeded. By way of example, the threshold may be derived from the previously detected (local) maximum. The first local maximum can be greater than the second local maximum and the second local maximum, in turn, can be greater than or substantially the same height as the third local maximum. If this sequence of maxima is detected, there can be an increase in the reliability of the identification of the boundary surfaces, and hence in the determination of the focus. Then, the reference relative displacement position is therefore determined on the basis of the third maximum.

According to one embodiment of the present invention, the method is embodied in such a way that the reference relative displacement position corresponds to that relative displacement position for which the laser beam that was reflected at the third boundary surface, in particular the surface of the biochip, is imaged in focus on the subarea of the detection area, wherein, in particular, the relative displacement position for recording the image is set from a priori knowledge about the sample, proceeding from the reference relative displacement position. By way of example, the thickness of the sample (on the biochip) may be known in advance, at least approximately, and may be predetermined as a default value. Proceeding from the reference relative displacement position (where the surface of the biochip lies in the focal plane of the objective), the distance between the objective and the sample region, for example, can be modified or corrected as a function of the default value, e.g., by a few micrometers (depending on the thickness of the sample known in advance) in order to satisfy a sample type or substrate type. Then, preferably even more images can be recorded at displacement positions which lie around the corrected reference relative displacement position.

According to one embodiment of the present invention, the method is embodied in such a way that a dichroic or non-dichroic beam splitter is disposed between the source of the laser beam and the objective, for the purposes of reflecting the laser beam through the objective, said beam splitter more particularly having a reflectance for the laser beam of between 5% and 20%. Hence, the laser beam can easily be coupled into the beam path of the objective. If the reflectance for the laser beam is relatively low, for example substantially 10%, it is consequently possible also to exclude only a small component of the light provided for recording the image from the detection by the microscope camera. In other embodiments, the beam splitter may also be removed from the beam path when the image of the sample region is recorded.

According to one embodiment of the present invention, the method is embodied in such a way that the beam splitter has a wedge shape, wherein planes of a front side and back side of the beam splitter intersect at a wedge angle, which lies, for example, between 0.1° and 1°, in particular, wherein the wedge angle and the size of the subarea, in particular, are chosen in such a way that only a reflection of the laser beam, which is imaged following reflection of either the front side or the back side of the beam splitter and following reflection from the sample region onto the subarea. The beam splitter with a wedge form may reduce the occurrence of interferences, which may arise as a result of reflection at a front side and a back side of a beam splitter embodied as a plane plate. For focusing purposes, use can be made, in particular, of the laser light reflected at the front side of the wedge-shaped beam splitter. The laser light reflected at the back side of the wedge-shaped beam splitter is focused at a laterally different location in the object-side focal plane of the objective. By a suitable choice of the size and position of the two-dimensional subarea of the detection area of the microscope camera, a laser beam reflected this at the wedge-shaped beam splitter can be precluded from the detection. Hence, the method can be further improved. Preferably, the subarea comprises all pixels of the detector area.

According to one embodiment of the present invention, the method is embodied in such a way that the intensity values of the pixels of the subarea are read between 1000 and 10 000 times a second during the relative displacement of the objective and the sample region in order to determine the reference relative displacement position.

It should be understood that features which are described, explained or provided individually or in any combination in conjunction with the method for recording an image of a sample region can just as well be applied, individually or in any combination, to a microscopy system for recording an image of a sample region, according to embodiments of the present invention.

According to one embodiment of the present invention, a microscopy system is provided for recording an image of a sample region, said microscopy system comprising: a laser source that is embodied to generate a laser beam; at least one objective that is embodied to direct the laser beam on the sample region which contains at least one boundary surface, wherein the objective further effectuates imaging of the laser beam on a focusing point, is located in a focusing plane that is parallel to the focal plane and preferably coincides with the latter, and which preferably is located on the optical axis of the objective or an axis parallel thereto; further, the objective is displaceable to a plurality of different relative displacement positions relative to the sample region along the optical axis; further comprising at least one microscope camera with a detection area, wherein the microscope camera is embodied to capture, for a respective relative displacement position, a plurality of intensity values of the laser beam that was reflected at the boundary surface and that passes through the objective, wherein the intensity values of pixels of a two-dimensional subarea of a detection area of a microscope camera are detected; at least one processor that is embodied to determine a respective highest intensity value of the captured intensity values of the subarea for a respective relative displacement position, that is further embodied to determine a profile of the highest intensity values by assigning the respective highest intensity value to the respective relative displacement position, that is further embodied to determine a reference relative displacement position from at least one local maximum of the profile (67) of the highest intensity values, that is further embodied to set a drive means (15) for driving to the reference relative displacement position, and that is further embodied to capture an image of the sample region by means of the microscope camera or a further microscope camera.

The microscopy system 100 illustrated in a schematic lateral sectional view in FIG. 1 comprises an objective 3, which is displaceable along an optical axis 13 of the objective relative to a sample region 2. In general, the objective 3 and the sample region 2 can be displaceable relative to one another along the optical axis 13. To this end, a drive means 15 is provided, the latter being embodied to displace a microscope stage 1 (or the objective 3) along the arrow directions 17 (i.e., in the Z-direction or the vertical direction) while the objective 3 is stationary or to displace the objective while the stage is stationary. The microscopy system 100 further comprises a laser 10, which is embodied to generate a laser beam 19 that is directed through the objective 3 on the sample region 2. The laser light source or the laser 10 contains a collimation optical unit 10a, by means of which the laser beam can be formed into a parallel, collimated bundle of rays. Preferably, the collimation optical unit 10a is adjustable in order to form the laser beam as a convergent bundle of rays. The sample region contains at least one boundary surface, as explained in more detail below with reference to FIG. 2. In order to steer the laser beam 19 through the objective 3, provision is further made of a beam splitter 11. The objective 3 brings about an imaging of the laser beam on a focusing point, which is located on the optical axis of the objective or on an axis parallel thereto and which is further located in a focusing plane that is parallel to the focal plane of the objective and preferably coincides with the focal plane. The focusing plane extends perpendicular to the optical axis of the objective 3.

In one embodiment, the focusing plane of the laser beam 19 coincides with the focal plane of the objective, wherein, preferably, the focusing point more particularly coincides with the focus of the objective. Thus, the focusing point is preferably located in the focal plane. Here, the laser beam 19 preferably has a collimated, parallel bundle of rays, as illustrated in FIG. 1. Preferably, a cross-sectional diameter d of the laser beam 19 in this case substantially equals the aperture of the objective 3 at the location at which the laser beam 19 enters the objective 3; expressed differently: the diameter d of the laser beam 19 is dimensioned in such a way that the full aperture of the objective 3 at the location at which the laser beam 19 enters the objective 3 is illuminated.

In a further embodiment, the laser beam has a bundle of rays that is convergent toward the objective, as still described below with reference to FIG. 9. Preferably, the focusing plane of the laser beam does not coincide with the focal plane of the objective, and so, in particular, the focusing point does not coincide with the focus of the objective. Here, the focusing plane of the laser beam preferably has a smaller distance from the objective than the focal plane of the objective. However, here, too, the focusing plane extends perpendicular to the optical axis of the objective 3. Here, too, the focusing plane extends parallel to the focal plane.

The microscope system 100 of FIG. 1 further comprises at least one microscope camera 8 with a detection area 29, which is embodied to capture intensity values, detected by pixels of a two-dimensional subarea of the detection area, of the laser beam 19 that was reflected from the sample region 2 and passed through the objective 3. In the embodiment 100 of the microscopy system, illustrated here in FIG. 1, a set of filters 7 is provided for deflecting red light, which has passed through the objective 3 and a tube lens 6, so as to reflect light with a red component onto the microscope camera 8. To this end, the set of filters 7 is provided for red-green channel separation. In particular, the set of filters 7 comprises a semi-transparent mirror 21 and a red filter, which filters out wavelengths from outside of a red wavelength band such that only wavelengths in a desired red band strike the detection area 29 of the microscope camera 8.

The set of filters 7 further preferably comprises a green filter 25 in order only to pass through a desired green band onto a preferably present second microscope camera 9. The second microscope camera 9 is optional; only a single microscope camera need be provided in other embodiments. The set of filters 7 is also optional and may be omitted in other embodiments. In these embodiments, the microscope camera 8 can be disposed along the optical axis 13 in place of the second microscope camera 9. However, for certain fluorescence examinations, it may be advantageous to record the fluorescence light of a plurality of fluorophores separately by way of two different microscope cameras or detection channels.

The microscopy system further comprises a lens 6 (illustrated schematically in FIG. 1), more particularly a tube lens, or a lens system 6, which is disposed between the objective 3 and the microscope camera 8 in a beam path and which, together with the objective 3, images a focal plane 27 of the objective 3 on the detection area 29 of the microscope camera 8. In particular, the objective and lens 6 together form an optical system, which effectuates imaging of the focus of the focal plane of the objective on an image point of an image plane, at which the detection area 29 is situated. The detection area 29 of the microscope camera 8 is located in a focal plane 31 of the lens 6.

For a respective relative displacement position, the system 100 may capture a plurality of intensity values of the laser beam that was reflected at the boundary surface and passed through the objective, wherein the intensity values are detected by pixels of a two-dimensional subarea of the one detection area 29 of the microscope camera 8.

The microscopy system 100 further comprises a processor 33, which is embodied to determine a respective highest intensity value of the captured intensity values of the subarea 65 for a respective relative displacement position. A highest intensity value determined in this way is assigned to the corresponding relative displacement position such that a profile of highest intensity values is determined from such respective highest intensity values for respective relative displacement positions. Then, a reference relative displacement position is determined from at least one maximum, more particularly a local maximum, of the profile of the highest intensity values. The processor then actuates the drive means 15 for driving to the reference relative displacement position using a control unit 37. Further, the processor 33 captures an image of the sample region by means of the microscope camera 8 or a further microscope camera 9. Here, the processor 33 transmits a request signal 38 to the controller 37 for requesting that a certain position be set in the z-direction.

To this end, the processor 33, which may be comprised in a computer, for example, has a communication link to the microscope camera 8 in order to capture or read intensity signals 35 of the intensities of the pixels of the subarea of the detection area 29, in particular in a red channel. By way of this camera 8, the processor 33 can preferably also capture or read intensity signals 35 of the intensities of the pixels of the detection area 29 in order to capture an image of the sample region, in particular in a red channel.

Preferably, the processor 33 further has a communication link to the further microscope camera 9 in order to preferably read intensity signals 35*a* of the intensities of the pixels of a detection area 29*a* in order to capture an image of the sample region, in particular in a green channel.

The microscopy system 100 further comprises the control unit or controller 37, which is likewise connected to the processor 33 (or comprises the processor) and which is embodied to actuate the drive 15 by control signals 39 for the purposes of displacing the microscope stage 1 (or the objective 3). Further, a measurement system MS can be provided, which independently measures the Z-position (i.e., relative displacement position) and communicates this to the controller 37.

Then, for the purposes of recording an image of the sample region 2, a relative displacement position for recording the image is determined on the basis of the reference relative displacement position and said relative displacement position is set and the image is finally recorded by means of the microscope camera 8 or the microscope camera 9.

Figure 2:
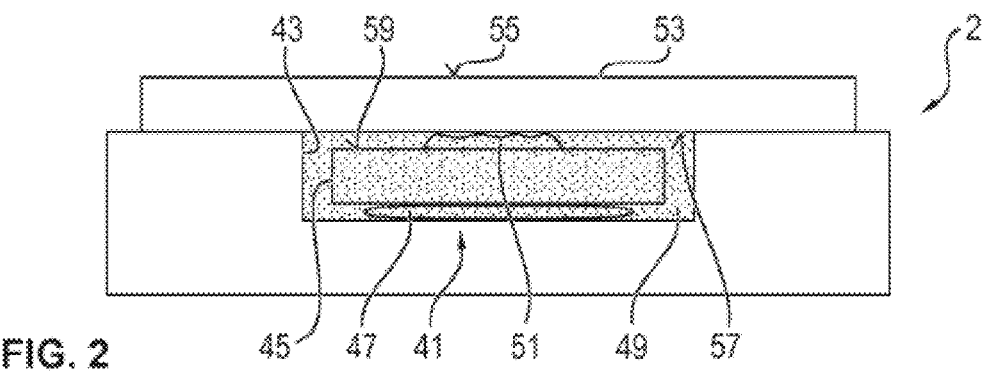
FIG. 2 shows, in a schematic side view or lateral sectional view, a sample region with a sample, an image of which can be recorded using the microscopy system illustrated in FIG. 1.

The sample region 2 comprises an object carrier with an embedded biochip, as illustrated in greater detail in a schematic lateral sectional view in FIG. 2. The sample region 2 comprises an object carrier 41, which has a plate-shaped structure with a cutout 43. A biochip 45 is disposed in the cutout 43 of the object carrier 41 and said biochip is attached to the object carrier 41 by means of an adhesive 47. Glycerol 49 is filled around the biochip 45 within the cutout 43. A (biological) sample 51 is applied to the biochip 45. Consequently, the sample 51 is embedded in the glycerol 49. A coverslip 53 covers the cutout 43 with the sample 51, which is situated therein and surrounded by glycerol 49. The coverslip 53 has an upper surface 55, which forms a first boundary surface, and a lower surface 57, which forms a second boundary surface. The surface 59 of the biochip 45 forms a third boundary surface. In particular, this third boundary surface 59 is determined in a focusing method according to an embodiment of the present invention.

The reference relative displacement position (relative vertical distance between the objective 3 and the sample region 2) is adopted when the laser beam 19 is focused by the objective 3 on the surface 59 (i.e., third boundary surface) of the biochip 45. As soon as this reference relative displacement position has been found, it is possible to record one or more images by reading the detection area 29, preferably the entire detection area, of the microscope camera 8 when, for example, the sample 51 is illuminated by visible light or illuminated by suitable fluorescence-exciting light. Alternatively, use is made here of the detection surface 29a of the camera 9.

In the embodiment illustrated in FIG. 1, the microscope stage 1 is displaced vertically for the purposes of changing the relative displacement position (distance between objective 3 and sample region 2) while the objective 3 is stationary. In other embodiments, the microscope stage 1 can be stationary while the objective 3 can be displaced vertically.

For the purposes of exciting fluorescence in the sample 51 (to which, e.g., fluorophores may have been added), a light source 4 (e.g., an LED) is used, the latter generating excitation light 201 in a suitable, e.g., blue, emission spectrum. A set of fluorescence filters 5 spectrally separates the excitation light and fluorescence light. With the aid of the objective 3 and the tube lens 6, the fluorescence light emitted in the object plane 27 is imaged in magnified fashion on the two microscope cameras 8, 9. Between the objective 3 and the tube lens 6, the light beams of the fluorescence light extend in parallel; therefore, the space between the objective 3 and the tube lens 6 is also referred to as "infinity space". To this end, the set of fluorescence filters 5 may comprise a dichroic mirror 61, which reflects the fluorescence excitation light 201 while the fluorescence light can pass therethrough substantially without reflection.

For fast focusing before an image recording, the sample is optically measured prior to the microscopic recording with the aid of the laser- and camera-based system. Here, for the purposes of determining the focus position of the surface of the biochip, the light of the laser 10 with, e.g., visible red emission spectrum is used and coupled onto the optical axis 13 of the objective 3 with the aid of the beam splitter plate 11. Here, input coupling can be implemented in the infinity space (i.e., in the section in which the beams extend parallel to one another) of the microscope. The laser beam 19 is shaped here by an optical unit, not illustrated, to form a parallel bundle of rays 19. In this embodiment, the laser beam has a collimated, parallel bundle of rays. In one embodiment, the focusing plane of the laser beam coincides with the focal length plane of the objective. Preferably, a cross-sectional diameter of the laser beam is substantially equal to the aperture of the objective.

The laser beam 19 passes through the set of fluorescence filters 5 and is focused by the objective 3 into the object plane 27 of the microscopy system 100. Should an optical boundary surface be situated in the focal plane 27 of the objective 3, a punctiform reflection of the laser beam 19 arises, said reflection being imaged by the objective 3 and the tube lens 6 on the microscope camera 8, more particularly on the detection area 29 of the microscope camera 8.

Here, the reflection of the laser beam 19 appears as a punctiform signal in the image of the camera, the intensity of which depends on the boundary surface-transition in the materials of the object carrier.

FIG. 3 shows an overall image of a punctiform laser reflection, as was recorded by the entire detection area 29 of the microscope camera 8. The overall image 63, as registered by the microscope camera 8, comprises 1024×1024 pixel, for example.

In the method for determining the reference relative displacement position, (i.e., the position at which the surface 59 of the biochip 45 is disposed in the focal plane 27 of the objective), only a subarea of the pixels of the entire detection area 29 of the microscope camera 8 is read while the distance between the objective 3 and the sample region 2, or the relative displacement position, is modified.

In this respect, FIGS. 4a, 4b and 4c illustrate exemplary subareas 65a, 65b, 65c of the detection area 29 and the intensities detected from the pixels contained therein, as grayscale values of the image of the laser reflection for different relative displacement positions. By way of example, the subareas 65a, 65b, 65c can be formed by 16×16 pixels. Here, FIGS. 4a, 4b and 4c illustrate partial images which arise at z=−0.5 µm, z=0 µm and z=+0.5 µm relative to the relative distance between objective 3 and sample region 2, wherein the surface 59 of the biochip 45 is disposed in the focal plane 27 of the objective such that the reference relative displacement position to be determined is assumed for z=0 µm. The respective highest intensity value Gmax is likewise illustrated. If the focal plane of the objective is moved away from the corresponding boundary surface in the object carrier (see FIGS. 4a, 4c), the laser signal is imaged in attenuated or broadened fashion. It is evident from FIGS. 4a, 4b and 4c that the saturation of the individual pixels already significantly reduces in the case of displacements of approximately +/−500 nm; i.e., the highest pixel intensity of the subarea is greatest when precisely the reference relative displacement position is adopted, i.e., in the case of FIG. 4b. By using the system, described here, with focusing of the laser beam on a focus in the focal plane of the objective, it is possible to obtain a particularly accurate spatial resolution of the z-position. Were a spatially extensive and overall pattern to be projected onto a plurality of pixels of the subarea, this pattern would have a greater spatial extent than the laser beam used in this case, even in the ideal focusing position, and so a spatial resolution in the z-direction would also be coarser or less accurate. Further, in the case of such a pattern projection, it would not be sufficient to consider only a single highest pixel intensity of the subarea as a measure for focusing, as is possible in the method according to the invention; instead, a plurality of pixels would have to be combined and focusing in respect of the extensive pattern would have to be determined as a measure for focusing by way of a common analysis of the plurality of pixels, the latter evidently being more time-consuming than the consideration, according to the invention, of the highest intensity of an individual pixel of the subarea.

In order to determine the focus position of the biochip surface (i.e., the relative distance between objective 3 and sample region 2, at which the surface 59 of the biochip 45 is in the focal plane 27 of the objective 3), the object carrier 41 is moved in the Z-direction 17 through the focal plane 27 of the microscopy system 100, preferably with a first distance resolution or spatial resolution. This can be achieved with the aid of an objective mount that is motor-driven in the Z-direction or by moving the object carrier 41. For the purposes of determining the focus, the intensity profile of the laser reflection is recorded with an image capture rate corresponding to the distance resolution or spatial resolution by the microscope camera 8. In order to be able to achieve frame rates that are as high as possible, only a small subarea (e.g., subarea 65 illustrated in FIGS. 4a, 4b, 4c) is read and transmitted to the processor 33. By way of example, the subarea may comprise 16×16 pixels, as a result of which image capture rates of several thousand frames per second, e.g., approximately 3000 frames per second, are achievable.

FIG. 4d illustrates a preferably used predetermined area 66 in exemplary fashion, in which area intensity values of one or pixels are captured and evaluated in order to ascertain the maximum of the subarea (e.g., 65a, 65b, 65c). The predetermined area 66 may correspond to precisely the area of an individual pixel, or a plurality of pixels can be used to cover the predetermined area 66.

The highest pixel grayscale value or the highest intensity value can be ascertained for each partial image recorded for a certain relative distance (relative displacement position). By knowing the request signal 28 to the controller 37, the processor 33 is able to link the camera data or intensity values with the associated relative displacement positions and, further, able to determine the reference relative displacement position.

Figure 5:
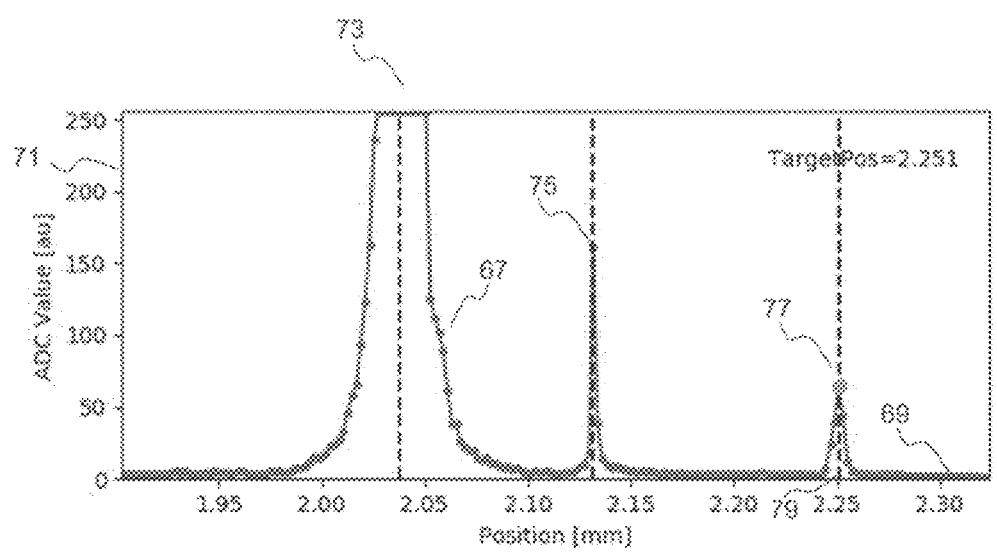
FIG. 5 illustrates a profile of highest intensity values as a function of a relative displacement position, as determined according to one embodiment of the method.

FIG. 5 illustrates an example of a profile (curve 67) of the highest determined intensity values (determined for each relative displacement position) as a function of the relative displacement position as a curve 67 in a coordinate system, wherein the relative displacement position (Z-position) is plotted on an abscissa 69 and the respective highest intensity value in the subarea is plotted at the associated relative displacement position on the ordinate 71. Here, the lowest Z-value indicates a position at which the sample region is situated furthest from the objective; the highest Z-value here indicates a position at which the sample region is situated closest to the objective. Initially, there is a relative displacement of the objective and of the sample region with respect to one another by way of reducing a relative distance between the objective and the sample region with a first distance resolution, from a greatest distance to a smallest distance, wherein the profile of the highest intensity values, which has a plurality of maxima, is determined. In particular, the profile has a first local maximum 73, thereafter a second local maximum 75 and finally a third local maximum 77 of the profile.

The curve 67 exhibits a characteristic signal pattern ("autofocus signal"), which is based on the geometry of the sample region, as illustrated in FIG. 2. Since the structure of the sample region 2 is known, the Z-position of the biochip 45, more particularly of the surface 59 of the biochip 45, can be determined from the signal profile (curve 67).

The curve 67 (autofocus signal) has a first maximum 73, which originates from the reflection of the laser beam 19 at the first boundary surface 55 (upper surface of the coverslip 53). Further, the curve 67 has a second maximum 75, which originates from the reflection of the laser beam 19 at the lower surface 57 (second boundary surface) of the coverslip 53. Finally, the curve 67 has a third maximum 77, which originates from the reflection of the laser beam 19 at the surface 59 of the biochip 45 (third boundary surface). The focus position of the biochip surface 59 or the reference relative displacement position emerges here from determining the Z-position 79 of the third signal maximum 77.

Figure 6:
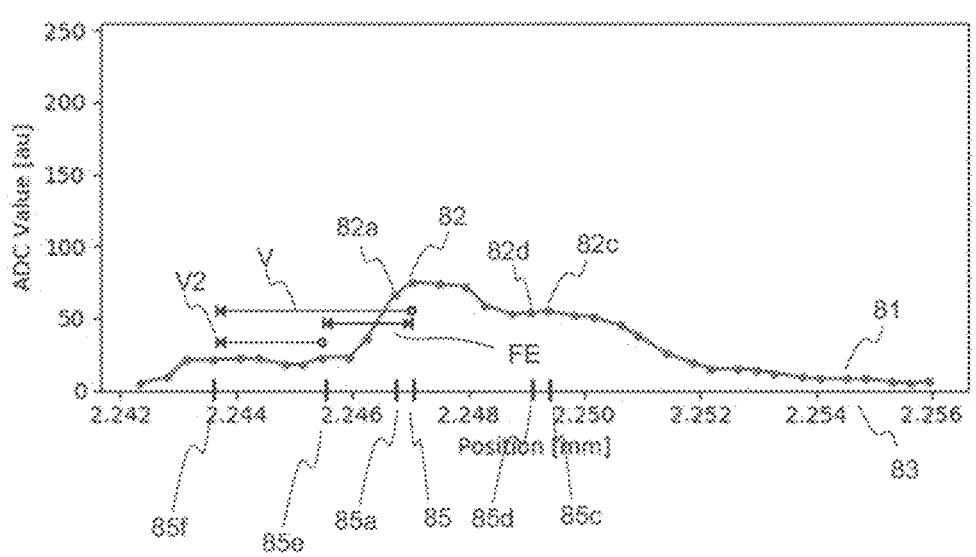
FIG. 6 shows a further example of a local maximum in a profile of maximum values as a function of a relative displacement position, as determined according to an embodiment of the method.

With the aid of the microcontroller or the controller 37 and a drive means for displacing the objective 3, the objective 3 can subsequently be driven back again in the direction of the ascertained focus location or the reference relative displacement position while the distance between the objective and sample region is increased. This driving back is implemented, in particular, using a second distance resolution, which is higher or finer than the first distance resolution. Here, the length of the travel over the autofocus signal is controlled which is monitored and evaluated at the same time as the movement in Z. Here, respective further highest intensity values are determined at respective, further relative displacement positions and a presence of the maximum 82 from FIG. 6 is detected on the basis of the further intensity values. Preferably, then, the relative displacement position is set at such a final reference relative displacement position at which the local maximum is or was present, the latter being detected on the basis of the further highest intensity values, in the case where the laser beam has a parallel bundle of rays collimated toward the objective and, further, the focusing plane of the laser beam coincides with the focal plane of the objective.

To this end, FIG. 6 illustrates an autofocusing signal which originated from the reflection of the laser beam 19 at the surface 59 of the biochip 45; i.e., a third maximum 82 in a profile at a position 85. The profile 81 of the further highest intensity values in the subarea as a function of the Z-position on the abscissa 83 was determined using an objective with a 20-fold magnification and numerical aperture of 0.5, wherein use is made of a laser with an emission wavelength of $\lambda_0 = 635$ nm. The axial resolution of this signal 81 can be determined to be approximately 2.1 µm, for example from the full width at half maximum A. The reference relative displacement position 85 can be determined, for example, as the Z-position at which the maximum 82 occurs, or as a centroid of the curve 81 or a centroid of the maximum 82. Then, the objective can be displaced relative to the sample region to the relative displacement position 85, at which the maximum 82 of the further highest intensity values was present. This may possibly require a further direction reversal of the drive 15 of FIG. 1 since the value 82 at the position 85 may only be recognized as the maximum 82, for example, if a subsequent presence of the value 82a at the position 85a is recognized, and so there must be a displacement back from the position 85a to the position 85.

The focus position as the final reference relative displacement position preferably counts as reached and the travel movement is preferably stopped if the following conditions are satisfied:

A previously defined threshold of the autofocus signal was exceeded. This threshold is ascertained from the signal level of the previously ascertained autofocus signal.

The autofocus signal reaches a local maximum 82.

However, the surface of the biochip need not represent the optimal imaging plane for the fluorescence microscopy since the layer thickness of the sample 51 may in part be greater than the depth of focus of the microscopy system 100. Therefore, a plurality of fluorescence recordings may be made about the ascertained focus position or the ascertained final reference relative displacement position. Therefore, a plurality of images of the sample region can then preferably be captured by means of the camera 8 or the further camera 9 from FIG. 1, proceeding from the final reference relative displacement position. The camera 8 preferably captures images in a red channel. The camera 9 preferably captures images in a green channel. In the process, the objective and the sample region are displaced relative to one another along the optical axis to respective concluding relative displacement positions above and/or below the final reference relative displacement position. Further, respective images are captured at the respective concluding relative displacement positions by means of the first microscope camera 8 or the further microscope camera 9 in this case. Then, the processor 33 stores the respective images and determines respective focus metrics for the respective images. Then, the processor 33 selects the image that has the best focus metric. Preferably, the processor 33 discards the other images, which do not have the best focus metric.

As emerges from FIG. 5, the maxima have signal levels with a specific pattern. From the profile, the third maximum 77 can preferably be recognized as reliably detected, for example, if the signal level of the local maximum 77 is higher than a previously determined or predetermined threshold and if, further, a local maximum is in fact present, i.e., if intensity values to the right and left of the reference relative displacement position 79 are lower than the intensity at exactly the reference relative displacement position 79. Consequently, the reference relative displacement position can preferably be ascertained in reliable fashion, the laser beam 19 being focused on the surface 59 of the biochip 45 at said reference relative displacement position. In order to be able to reliably separate the maxima 73, 75 and 77 from one another, the resolution of the autofocus system approximately equals the depth of field of the microscopy system according to one embodiment of the present invention. The diameter d of the parallel laser beam 19 (see FIG. 1) is preferably dimensioned in such a way that the full aperture of the microscope objective 3 is illuminated. By way of example, use can be made of a laser that has a red emission wavelength (e.g., $\lambda_0$=635 nm); for this, a depth of field of approximately $t_w$=2.54 µm arises in the case of a numerical aperture of 0.5.

In order to prevent light, which has been cast back from outside of the focal plane 27, from being superposed on the measurements and thus reducing the axial resolution of the method, the physical properties of the laser and detector are advantageously used without needing a perforated stop, as is used conventionally. The active emission area of the laser 10 can advantageously be a few µm, and so a punctiform light source is present. As a result, it is possible to dispense with a light source perforated stop.

It is also possible to dispense with a detector perforated stop since, according to one embodiment of the invention, the signal strength at each Z-measurement point (at each relative displacement position) is respectively only defined by the pixel with the highest intensity value in the subarea of the detection area 29. In this way, it is possible to simulate a virtual perforated stop of a few square micrometers, the area of which corresponds to the pixel area. Depending on the size of the pixel, the predetermined area can be provided by one or more pixels. As a result of the larger camera image region of 16×16 pixels, evaluated in the process, the method can be robust at the same time in relation to the deviations of the laser position from the image region center. In the case of short exposure times, the influence of reflections imaged out-of-focus from outside the focal plane can be reduced so strongly that the obtained signal is defined almost exclusively by laser reflection from the focal plane 27. By way of example, 3.45 µm×3.45 µm can be used as a pixel dimension and the exposure times can lie, for example, between 20 µs and 1000 µs.

Figure 7:
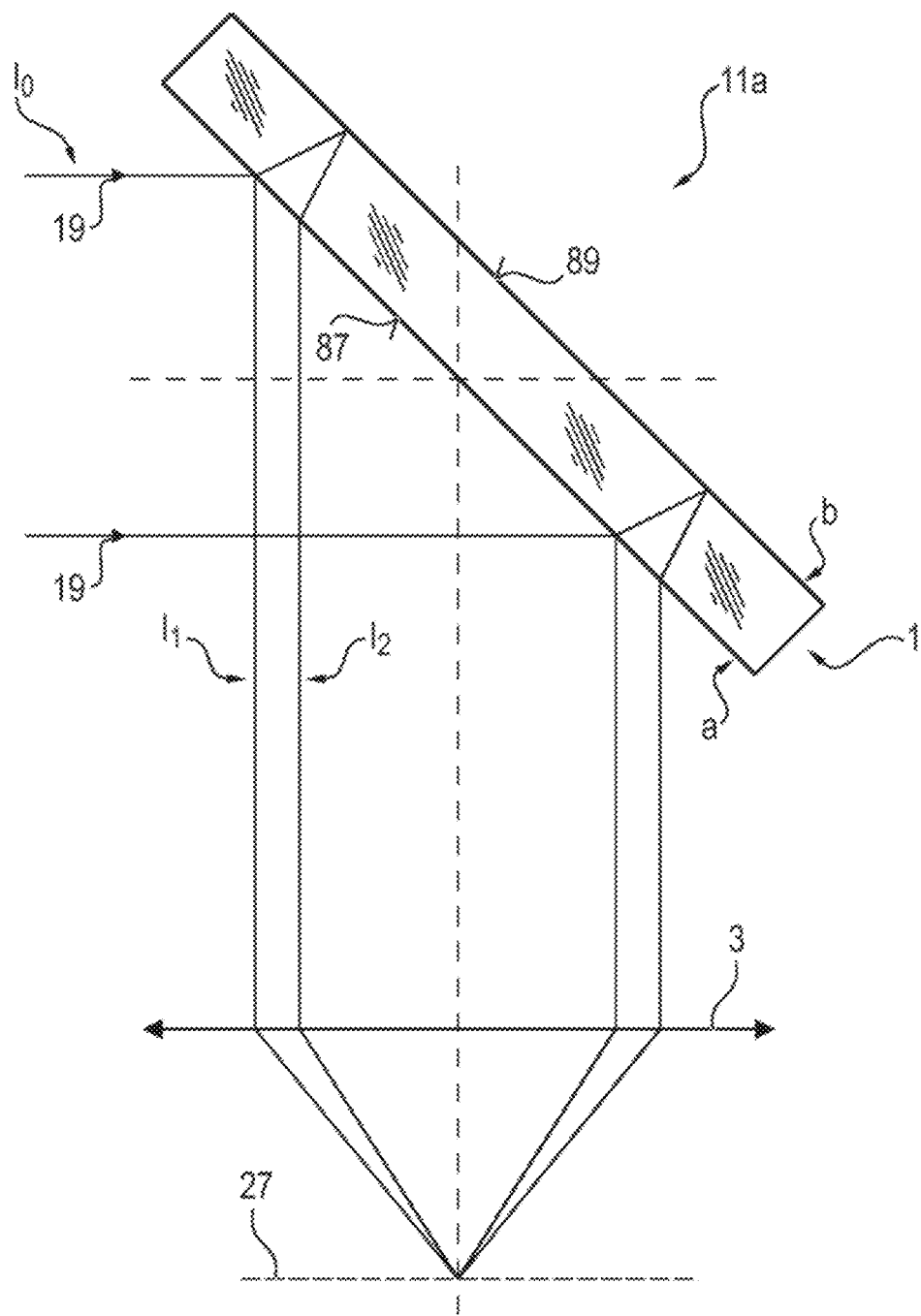
FIG. 7 illustrates a schematic lateral sectional view of a microscopy system according to an embodiment of the present invention, in the region of a plate-shaped beam splitter.

FIG. 7 illustrates, in a schematic lateral sectional view, a beam splitter 11a according to one embodiment of the present invention, which may be used, for example, in the microscopy system 100 illustrated in FIG. 1. The beam splitter 11a is a parallel plate beam splitter with a front surface 87 and a back surface 89, at which the laser beam 19 can be reflected in each case in order to lead to two different reflected partial beams $I_1$ and $I_2$, from the original beam $I_0$ before being split. The front surface 87 is also shown with a section a, and the back surface 89 is also shown with a section b. The two partial beams $I_1$ and $I_2$ are superposed in the focal plane 27 by the objective 3, as a result of which power variations may arise. For the purposes of reducing these power variations, a low-coherence light source can be used, as a result of which the interferences can be reduced.

Figure 8:
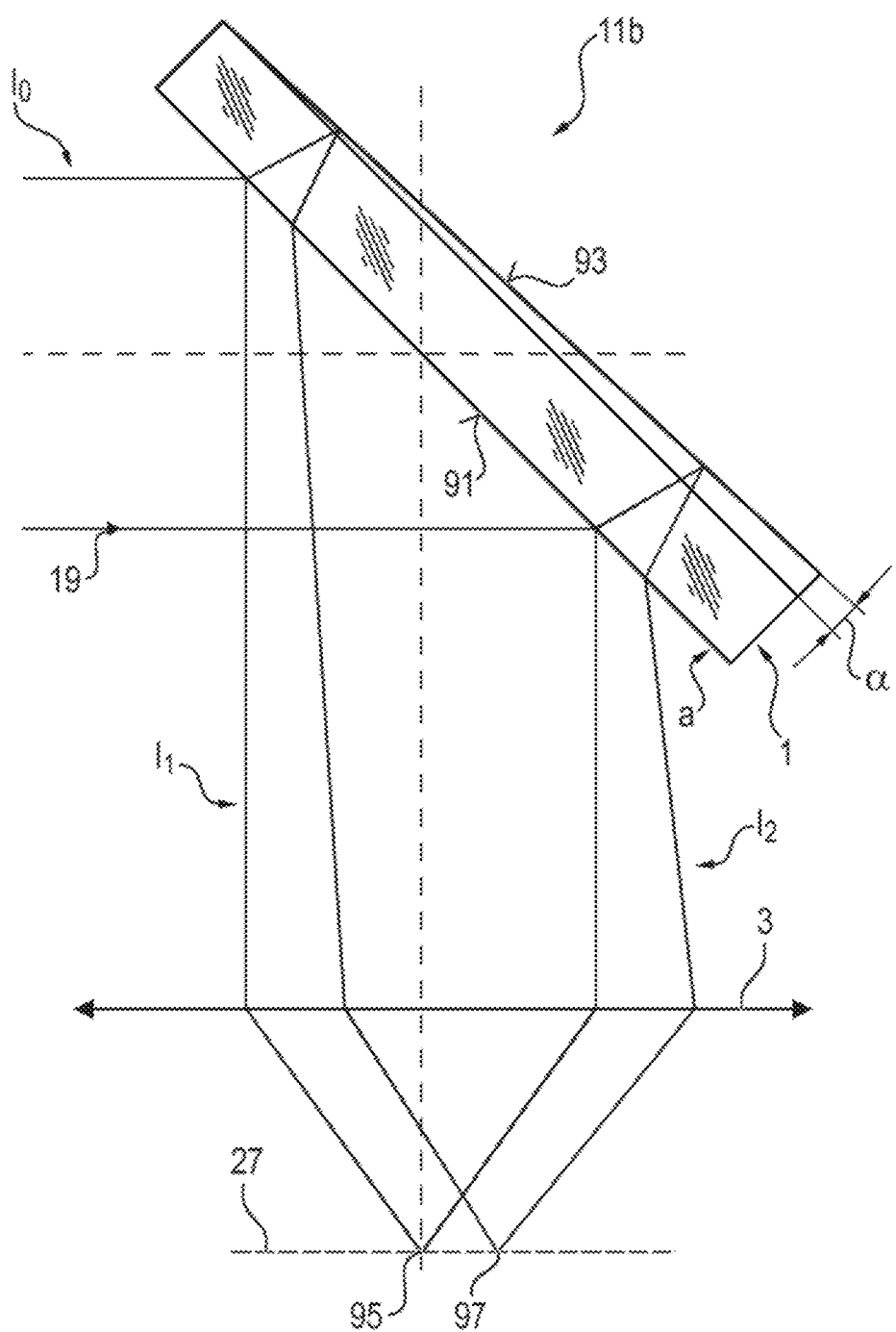
FIG. 8 illustrates, in a schematic lateral sectional view, a part of a microscopy system according to an embodiment of the present invention, in the region of a wedge-shaped beam splitter.

Alternatively, a beam splitter plate 11b with a slight wedge angle ("wedge plate") can be used to reduce these power variations, as is illustrated schematically in a sectional view in FIG. 8. The wedge plate 11b has a front surface 91 and back surface 93, which are not parallel to one another but are further tilted with respect to one another by an angle α. The front surface 91 is also shown with a section a. By using this wedge plate as a beam splitter 11 (for example in the microscopy system 100 illustrated in FIG. 1), the laser reflections of the laser light 19 at the front side 91 and at the back side 93 are deflected in different directions in order to result in partial beams $I_1$ and $I_2$, from the original beam $I_0$ before being split, which accordingly enter the objective 3 at different angles and consequently are focused on two different locations 95 and 97, respectively, in the focal plane 27 of the objective. Consequently, the locations 95 and 97 are laterally offset in the object plane 27. Now, there no longer is a superposition of the two partial beams $I_1$, $I_2$ at the observation location and consequently there is no bothersome interference either.

Furthermore, the two partial beams 11 and $I_2$ may be superposed in the entrance pupil of the objective. However, an interference modulation forms at the superposition location, the spatial frequency of said interference modulation depending on the wedge angle of the beam splitter. In order to avoid power losses as a result of an inexpedient position of the minima and maxima of the modulation pattern in the entrance pupil, the wedge angle should be chosen to be at least so large that the interference pattern has at least 10 maxima or minima over the full aperture of the objective.

The beam splitter 11b with a wedge angle may also influence the imaging of the microscopy system 100. Thus, lateral, wavelength-dependent displacements of the microscope image and distortions in a one-dimensional direction may arise, for example. Therefore, the maximum wedge angle of the beam splitter depends on the respective microscopy application. By way of example, α=0.5° can be chosen as wedge angle in exemplary fashion.

In principle, possibly occurring imaging aberrations may be corrected by suitable additional optical elements or methods within the scope of the image evaluation. By way of example, provision can be made of a second wedge-shaped beam splitter plate, which is identical to the first beam splitter plate and disposed in the infinity space of the microscope in such a way that the angle changes by the wedge shape of the two beam splitters cancel one another.

The methods and systems according to the present invention may yield various advantages:

As a result of the dual use of the microscope camera in the red channel for focusing and for capturing one or more images of the sample region in the red channel, no additional detector then is necessary. This yields savings in terms of component costs and adjustment outlay. The number of additionally required components can be restricted to a beam-widened, collimated laser module and a beam splitter.

A high resolution in the Z-direction may arise as a result of evaluating a single pixel in the camera data, said resolution being comparable to a photodetector perforated stop combination (confocal technique). At the same time, the great adjustment outlay conventional in perforated stop applications may be dispensed with since a detector region with a multiplicity of pixels (typically 16×16) is captured for each measurement depth. Here, it is irrelevant which pixel within the region, i.e., the subarea, detects or has the maximum grayscale value.

Since the selection of the detector region may also be implemented dynamically (e.g., during the initialization phase of the microscope), the laser signal can be situated virtually arbitrarily on the detector area of the camera. Therefore, the method is very robust in comparison with perforated stop-based autofocus applications.

A laser module whose emission wavelength lies in the near infrared (NIR), for example at approximately 830 nm, can be used as a light source. In this case, a dichroic beam splitter 11 can be used for coupling the laser light into the beam path of the objective. A wedge-shaped beam splitter plate would not be required in this case.

In principle, a low-coherence light source, for example a superluminescent diode or a laser light source with a reduced coherence length, can also be used for avoiding interference-related signal variations. In this case, the wedge-shaped beam splitter plate could be replaced by a simple beam splitter (parallel plate). Here, the emission wavelength can lie in the visible or else in the near infrared.

The microcontroller-controlled movement in the Z-direction (change in the relative displacement position) can be implemented either by way of a motor-driven objective mount or by a motor-driven microscope stage.

According to embodiments of the present invention, no rigid perforated stop is used (upstream of the detection area); instead, the brightness of the individual pixels of a detector region of the camera is evaluated. The dimensions of the predetermined area 66 used for the evaluation (see FIG. 4D) may be of the order of the conventionally used physical perforated stop aperture.

According to the embodiment of the method described above with reference to FIGS. 1, 5 and 6, the laser beam has a parallel bundle of rays and is collimated toward the objective and, further, the focusing plane of the laser beam coincides with the focal plane of the objective. According to this embodiment, determining a first reference relative displacement position 79 on the basis of the maximum 77 from FIG. 5 is subsequently followed by an increase in the relative distance to the first reference relative displacement position with a second distance resolution, which is higher than the first distance resolution. Here, further highest intensity values at the respective, further relative displacement positions are captured at the same time, and so, if a local maximum is detected as present on the basis of the further highest intensity values, the relative displacement position at which the local maximum detected on the basis of the further highest intensity values is present or was present is set as a final reference relative displacement position. As described above, this may require a further direction reversal. If such a direction reversal is implemented, a so-called reversal play of the mechanism of the drive means 15 of FIG. 1 may result in an incorrect alignment between objective and sample region, and so a quality of focusing may be reduced as a result thereof.

Figure 9:
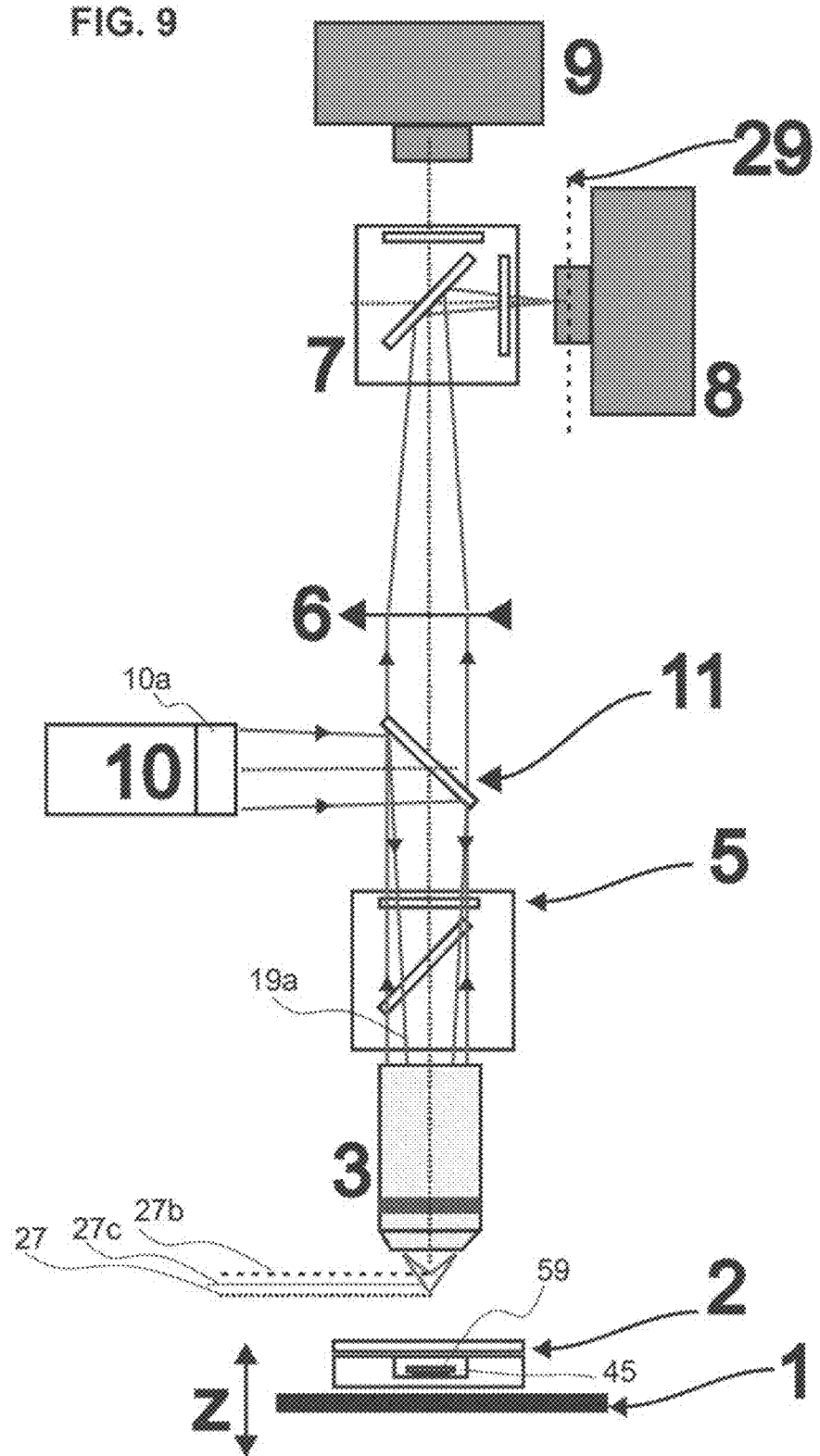
FIG. 9 illustrates an embodiment of the microscopy system according to the invention, in which the laser beam is focused in a focusing plane that does not coincide with the focal plane of the objective.

A further embodiment of the method is now described on the basis of FIG. 9; here, such a direction reversal can be avoided in order to avoid an incorrect alignment between objective and sample region on account of the reversal play. By means of the collimation optical unit 10a, the laser light source 10 is set in such a way that the laser beam has a bundle of rays 19a that converges toward the objective. As a result of this, the focusing plane 27b of the laser beam 19a through the objective 3 does not coincide with the focal plane 27 of the objective. In particular, this causes the focusing point not to lie in the focal plane 27. Here, the focal point is displaced by way of the collimation optical unit of the laser from the focus of the microscope toward the objective, in particular, preferably by a value of 3 to 10 times the depth of field of the objective. In this case, the convergence angle (half aperture angle) of the focused laser beam may preferably lie in the range of −1 arcmin to −15 arcmin, without being restricted to these values.

However, since the objective 3 and the lens 6 and also the camera 8, and in particular the mirror 7, are positioned relative to one another in terms of their respective optical distances such that beams from a common point of the focal plane 27, in particular the focus of the focal plane 27, of the objective 3 are imaged on a point of the detector area 29, there is no accurate imaging of a reflection of the laser beam point on a precise point of the detector area in the case where the boundary surface or surface 59 of the biochip of 45 is situated in the focusing plane 27. However, there is a further reflection plane 27c between the focal plane 27 and the focusing plane 27b, at which reflection plane the boundary surface or the surface 59 of the biochip of 45 brings about such a reflection of the laser beam that this reflection is likewise imaged in punctiform fashion at one point on the detector plane 29.

Figure 10A:
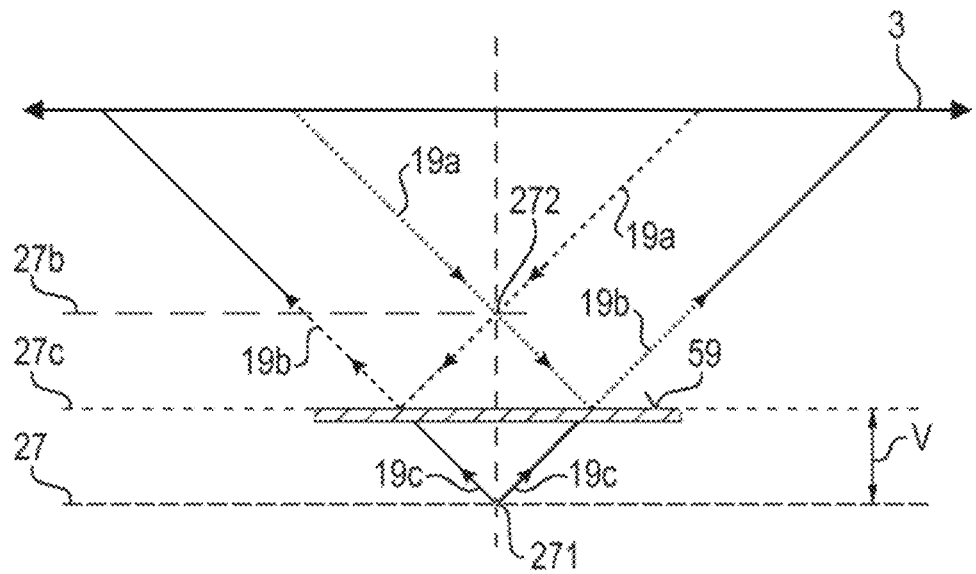
FIGS. 10a and 10b illustrate a reflection of the laser beam at a boundary surface in different optical planes.
Figure 10B:
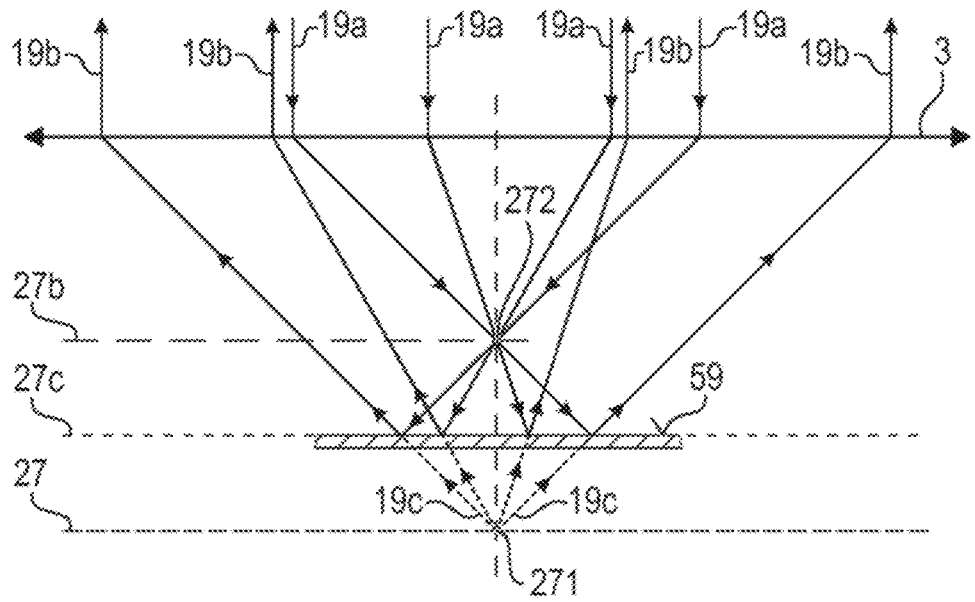

In this respect, FIGS. 10a and 10b show details of the optical aperture of the objective 3, the focal plane 27 with the focus 271 of the objective and the focusing plane 27b of the laser beam with the focusing point 272. The further reflection plane 27c is located between the focal plane 27 and the focusing plane 27b. The assumption is made that the boundary surface or the surface 59 of the biochip is situated on the further reflection plane 27c. Incident laser beams 19a are, in fact, reflected at the further reflection plane 27c and guided back to the objective as reflected laser beams 19b. These laser beams 19b enter the objective 3 at the same angle at which they would also enter if they had been reflected not in the further reflection plane 27c but in the correct focal plane 27; expressed differently: the laser beams 19a are reflected at the sample boundary surface in the further reflection plane 27c in such a way that the returning laser beams 19c appear to originate from a common point 271 of the focal plane 27, more particularly the focus 271 of the focal plane 27, of the objective 3, like beams 19c. Therefore, there then is also correct, punctiform imaging on a point in the detector plane 27 of FIG. 9 for these laser beams 19b reflected in the further reflection plane 27c.

The distance or the displacement V between the further reflection plane 27c and the actual focal plane 27 can be ascertained in advance with the aid of a reference sample for calibration purposes, installed in the microscope, and so a default value can be stored in the processor 33, which default value may later be used in the embodiment of the method.

FIG. 10b once again illustrates the effect of the further reflection plane for further beam paths 19a, 19b, 19c. A description follows below as to how this effect of the displacement of the focus, explained on the basis of FIGS. 10a and b, can be used for avoiding the reversal play.

Figure 11A:
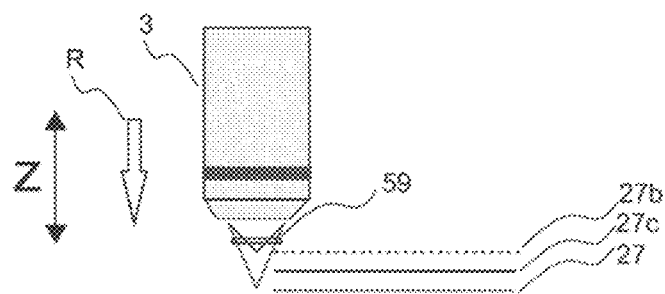
FIGS. 11a, 11b, 11c, and 11d illustrate different positions of the sample region when carrying out an embodiment of the method according to the invention, in which the focusing plane of the laser beam is offset in relation to the focal plane of the objective.

The assumption is made that initially, as described above, there has been a relative displacement of the objective and of the sample region with respect to one another by way of reducing a relative distance from the greatest distance to a smallest distance using a first distance resolution, such that the aforementioned profile of the highest intensity values has a plurality of maxima, as illustrated in FIG. 5. Then, the further assumption is made that the reference relative displacement position is determined as a first reference relative displacement position on the basis of the plurality of maxima. The further assumption is made that the surface 59 of the biochip, as a boundary surface, is then situated between the focal plane 27b of the laser beam and the objective 3, as illustrated in FIG. 11a. If there now is an increase in the relative distance between objective 3 and sample region, or between objective 3 and the surface 59 of the biochip, toward the first reference relative displacement position in a displacement direction R with a second distance resolution, which is higher than the first distance resolution, and if, at the same time, further highest intensity values are captured at the respective, further relative displacement positions, the assumption can be made that the curve 81 of further intensity values, illustrated in FIG. 6, is traced from the right in the direction of the maximum 82.

Figure 11B:
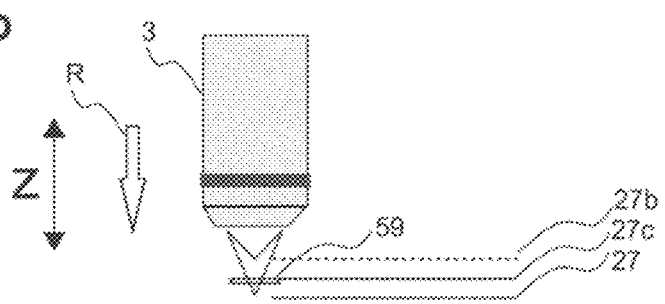

If then, as illustrated in FIG. 11b, the surface 59 of the biochip is situated exactly in the further reflection plane 27c, the maximum value 82 arises at the position 85 in the profile 81 of the curve. Then, the objective is displaced relative to the sample region (or vice versa) with a further second resolution accuracy or a second resolution accuracy step such that the distance between objective 3 and sample region is further increased. The displacement direction is plotted as direction R.

Figure 11C:
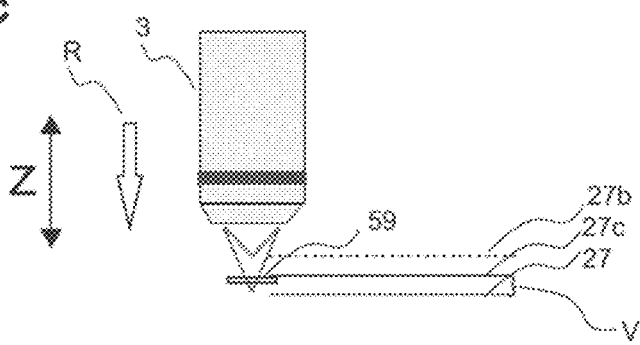
Figure 11D:
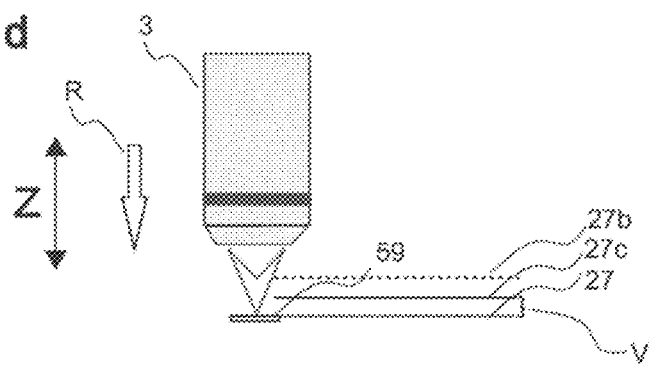

If the surface 59 of the biochip is in the position illustrated in FIG. 11b, i.e., in the further reflection plane 27c, the maximum value 82 arises at the position 85. If the surface 59 of the biochip is in the position illustrated in FIG. 11c, i.e., below the further reflection plane 27c, a value 82a that is lower than the maximum value 82 arises at the position 85a. Thus, it is then possible on the basis of the further highest intensity values of the profile 81 to detect that the local maximum 82 was present at the previous position 85. Now, preferably, only from the position 85a, which corresponds to FIG. 11c, the relative distance between the sample region or the surface 59 of the biochip and the objective must be increased by a predetermined default value to the final reference relative displacement position 85f, which corresponds to FIG. 11d with the sample region or the surface 59 of the biochip in the focal plane. This increase or this default value is chosen in a manner corresponding to the offset V between the focal plane 27 and the further reflection plane 27c, minus a second resolution accuracy step, to the extent of which the sample region or the surface 59 of the biochip was, of course, already displaced from the position in FIG. 11b to the position in FIG. 11c. This further increase is implemented in the same direction R without a direction reversal. This therefore avoids a direction reversal having to take place following the detection of the maximum 82 (FIG. 6) by means of a displacement of the sample region or the surface 59 of the biochip from the position 85a to the position 85f, and so, precisely, an inaccuracy on account of the reversal play of the mechanism of the drive 15 (FIG. 1) is also avoided. Without the offset V between the focal plane and the focusing plane, there would have to be a direction reversal from the position 85a to the position 85, and so a reversal play would have a negative effect in respect of the positioning of the sample region and hence also in respect of the focusing result.

Since the measurement values or the further highest intensity values of the curve 81 may also be superimposed by variations and noise, what is described below is preferably carried out for finding the maximum 82 and the final reference relative displacement position. Initially, the curve 81 is traced from right to left using the second distance resolution. If a decrease in successive values is determined from a previous value 82c of the position 85c or from a current maximum 85c to a current value 82d of the position 85d, a check is carried out to the left within a subsequent position window as to whether a further value that is greater than the previously detected, current maximum 82c can be found. The assumption is made that this is the case since an application to the left of the illustrated window FE from the position 85c would lead to values greater than the value 82c being found. If then, subsequently, the maximum 82 is found at the position 85, the lower value 82a is still found at the position 85a, but there is no value greater than the current maximum 82 within the window FE to the left. Then, the sample region or the surface 59 of the biochip is situated at the position 85e. The offset V between the focusing plane and the focal plane can then be taken into account accordingly, and so, from the position 85e, there is a displacement of the sample region or the surface 59 of the biochip further to the position 85f as the final reference relative displacement position by a default value or advance V2. The default value V2 is preferably determined according to V2=V−FE.

Embodiments of the present invention facilitate reliable focusing on optical boundary surfaces situated within a three-dimensional sample region and, in particular, having boundary surfaces that do not adjoin air. Laser reflections at boundary surfaces lying within the sample region are, as a matter of principle, weaker than laser reflections at the surface exposed to the air. By way of example, the reflectance of the glycerol-biochip boundary surface (i.e., the third boundary surface) may be only 0.029%. By contrast, the reflectance of the air to coverslip upper side boundary surface can be approximately 4.3%. Therefore, the boundary surface relevant for focusing purposes supplies a signal that is lower than the sample surface to air signal by a factor of approximately 150. Reliable focusing on the biochip surface can nevertheless be achieved on account of the identification of the characteristic reflection pattern as a function of the relative displacement position.

Depending on certain implementation requirements, exemplary embodiments of the invention can implement the processor and/or the control unit in hardware and/or in software. An implementation of the processor specified here and/or of the control unit specified here can be implemented as at least one unit, or else by a plurality of units in combination. The implementation can be performed using a digital storage medium, for example a floppy disk, a DVD, Blu-ray disc, CD, a ROM, a PROM, an EPROM, an EEPROM or a flash memory, a hard disk drive or any other magnetic or optical memory on which electronically readable control signals are stored, the latter being able to interact or interacting with a programmable hardware component in such a way that the respective method is carried out. A programmable hardware component can be formed as a control unit by a central processing unit (CPU), a computer, a computer system, an application-specific integrated circuit (ASIC), an integrated circuit (IC), a system on chip (SOC), a programmable logic element or a field programmable gate array (FPGA) with a microprocessor. The digital storage medium can therefore be machine-readable or computer-readable. Thus, some exemplary embodiments comprise a data medium that has electronically readable control signals that are able to interact with a programmable computer system or programmable hardware component in such a way that one of the methods described herein is carried out. In general, exemplary embodiments or parts of the exemplary embodiments of the present invention can be implemented as a program, as firmware, as a computer program or as a computer program product with program code or as data, wherein the program code or the data is effective to the effect of carrying out one of the methods or a part of a method if the program runs on a processor or programmable hardware component.

The invention claimed is:

1. A method for recording an image of a sample region, comprising:
   directing a laser beam on the sample region by at least one objective, the sample region containing at least one boundary surface, wherein the at least one objective effectuates imaging of the laser beam on a focusing point that is located in a focusing plane;

displacing the at least one objective and the sample region in relative fashion with respect to one another along an optical axis of the at least one objective to a plurality of different relative displacement positions;

capturing, for a respective relative displacement position, a plurality of intensity values of the laser beam that is reflected at the at least one boundary surface and passes through the at least one objective, the plurality of intensity values being detected by pixels of a two-dimensional subarea of a detection area of a microscope camera;

determining, for the respective relative displacement position, a respective highest intensity value of the plurality of intensity values of precisely one individual pixel of the respective plurality of detected intensity values of a partial area as a single highest pixel intensity;

determining a profile of highest intensity values by assigning each respective highest intensity value to each respective relative displacement position;

determining a reference relative displacement position from at least one maximum of the profile of the highest intensity values; and capturing at least one image of the sample region at the reference relative displacement position.

2. The method as claimed in claim 1,
wherein the laser beam has a collimated parallel bundle of rays and wherein a focusing plane of the laser beam coincides with a focusing plane of the at least one objective.

3. The method as claimed in claim 1,
wherein a diameter of the laser beam is dimensioned in such a way that a full aperture of the at least one objective is illuminated.

4. The method as claimed in claim 1, wherein the two-dimensional subarea is less than 1/10 of the detector area.

5. The method as claimed in claim 4, wherein the subarea is less than 1/100 of the detector area.

6. The method as claimed in claim 1, wherein a lens or a lens system, which images a focal plane of the at least one objective on the detection area, is disposed in a detection beam path between the at least one objective and the detection area.

7. The method as claimed in claim 1,
wherein the at least one boundary surface does not adjoin air,
wherein the sample region comprises an organic sample that rests on a substrate carrier, that is embedded in a liquid substance and that is covered by a coverslip,
wherein an upper side of the coverslip forms a first boundary surface,
wherein a lower side of the coverslip forms a second boundary surface,
and wherein the at least one boundary surface forms a third boundary surface.

8. The method as claimed in claim 7, wherein the reference relative displacement position corresponds to the relative displacement position for which the laser beam that was reflected at the third boundary surface is imaged in focus on the two-dimensional subarea of the detection area,
wherein the reference relative displacement position is modified or corrected for the purposes of recording the image based on a default value.

9. The method as claimed in claim 1,
wherein a relative distance between the objective and the sample region is initially reduced, proceeding from a greatest distance, while intensity values of the pixels of the two-dimensional subarea are captured, and
wherein the profile initially has a first local maximum, followed by a second local maximum and finally a third local maximum of the profile, wherein the reference relative displacement position is determined on the basis of the third local maximum.

10. The method as claimed in claim 1, wherein a dichroic or non-dichroic beam splitter is disposed between a source of the laser beam and the at least one objective to reflect the laser beam through the at least one objective.

11. The method as claimed in claim 10, wherein the beam splitter has a wedge shape, wherein planes of a front side and back side of the beam splitter intersect at a wedge angle, which lies between 0.1° and 1°.

12. The method as claimed in claim 11, wherein the wedge angle is chosen such that an interference pattern arising from a superposition of reflections at the front side and back side of the beam splitter has at least 10 maxima or minima over a full aperture of the at least one objective,
or
wherein imaging aberrations caused by the beam splitter, which has the wedge shape, are corrected by at least one additional optical element.

13. The method as claimed in claim 1, wherein the objective effectuates imaging of the laser beam on a focusing point that is located on the optical axis of the at least one objective or an axis parallel thereto.

14. A microscopy system for recording an image of a sample region, comprising:
a laser source that is embodied to generate a laser beam,
at least one objective
configured to direct the laser beam on the sample region which contains at least one boundary surface, wherein the at least one objective effectuates imaging of the laser beam on a focusing point which is located in a focusing plane, and
wherein the at least one objective is displaceable to a plurality of different relative displacement positions relative to the sample region along an optical axis of the at least one objective;
at least one microscope camera with a detection area, wherein the at least one microscope camera is configured to capture, for a respective relative displacement position, a plurality of intensity values of the laser beam that is reflected at the at least one boundary surface and that passes through the at least one objective, wherein intensity values of pixels of a two-dimensional subarea of a detection area of a microscope camera are detected; and
at least one processor configured to:
determine a respective highest intensity value of the captured intensity values of precisely one individual pixel of the respective plurality of detected intensity values of a partial area as a single highest pixel intensity,
determine a profile of highest intensity values by assigning each respective highest intensity value to each respective relative displacement position,
determine a reference relative displacement position from at least one maximum of the profile of the highest intensity values;
set a drive for driving the at least one objective to the reference relative displacement position, and capture an image of the sample region by the at least one microscope camera or a further microscope camera.

15. The microscopy system as claimed in claim 14, wherein the focusing point is located on the optical axis of the objective or on an axis parallel thereto.

* * * * *